(12) United States Patent
Zhao (10) Patent No.: US 11,274,017 B2
(45) Date of Patent: Mar. 15, 2022

(54) BELT WITH SELF-EXTINGUISHING LAYER AND METHOD OF MAKING

(71) Applicant: Otis Elevator Company, Farmington, CT (US)

(72) Inventor: Chen Qian Zhao, Newark, DE (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 190 days.

(21) Appl. No.: 15/686,551

(22) Filed: Aug. 25, 2017

(65) Prior Publication Data

US 2019/0062116 A1 Feb. 28, 2019

(51) Int. Cl.
*B66B 7/06* (2006.01)
*F16G 1/08* (2006.01)
(Continued)

(52) U.S. Cl.
CPC .............. *B66B 7/062* (2013.01); *B29D 29/00* (2013.01); *B66B 9/00* (2013.01); *D07B 5/006* (2015.07); *D07B 7/14* (2013.01); *F16G 1/08* (2013.01); *F16G 1/16* (2013.01); *B29K 2027/16* (2013.01); *B29K 2705/12* (2013.01); *D07B 2501/2007* (2013.01); *D10B 2321/021* (2013.01);
(Continued)

(58) Field of Classification Search
CPC ........... B66B 7/062; B66B 9/00; D07B 5/006; D07B 5/04; D07B 7/14; B29D 29/00; F16G 1/08; F16G 1/16
See application file for complete search history.

(56) References Cited

U.S. PATENT DOCUMENTS 6,441,128 B1 * 8/2002 Bauman ............... C08J 7/126
528/480
8,479,887 B2 * 7/2013 Yu .......................... B66B 7/062
187/251
(Continued)

FOREIGN PATENT DOCUMENTS

CN 101122099 A 2/2008
CN 101296758 A 10/2008
(Continued)

OTHER PUBLICATIONS

European Search Report Issued in EP Application No. 18190550.6, dated Jan. 7, 2019, 7 Pages.
(Continued)

*Primary Examiner* — Michael A Riegelman
(74) *Attorney, Agent, or Firm* — Cantor Colburn LLP (57) ABSTRACT

A belt for an elevator system includes a plurality of tension members arranged along a belt width and extending longitudinally along a length of the belt and a jacket at least partially enclosing the plurality of tension members. The jacket defining a traction side of the belt configured to interface with a traction sheave of an elevator system. The jacket includes a base material layer, and a coating layer positioned over the base material layer formed from a self-extinguishing fluoroelastomer material. A method of forming a belt for an elevator system includes forming a plurality of tension members and encapsulating the plurality of tension members in a jacket. The jacket includes a base material layer and a coating layer formed from the self-extinguishing fluoroelastomer material.

8 Claims, 5 Drawing Sheets

(51) Int. Cl.

| | | |
|---|---|---|
| *F16G 1/16* | (2006.01) | |
| *B66B 9/00* | (2006.01) | |
| *D07B 5/00* | (2006.01) | |
| *D07B 7/14* | (2006.01) | |
| *B29D 29/00* | (2006.01) | |
| *F16G 1/12* | (2006.01) | |
| *B29K 27/00* | (2006.01) | |
| *B29K 705/12* | (2006.01) | |

(52) U.S. Cl.
CPC .... *D10B 2321/022* (2013.01); *D10B 2331/02* (2013.01); *D10B 2331/04* (2013.01); *D10B 2331/10* (2013.01); *D10B 2403/033* (2013.01); *F16G 1/12* (2013.01)

(56) References Cited

U.S. PATENT DOCUMENTS

| | | | | |
|---|---|---|---|---|
| 8,525,033 | B2* | 9/2013 | Grether | D07B 1/02 |
| | | | | 174/128.1 |
| 9,670,035 | B2 | 6/2017 | Orelup et al. | |
| 2008/0171823 | A1* | 7/2008 | Rafailovich | C08K 7/24 |
| | | | | 524/495 |
| 2008/0296544 | A1* | 12/2008 | Wesson | B66B 7/062 |
| | | | | 254/264 |
| 2010/0133046 | A1* | 6/2010 | Allwardt | B66B 7/08 |
| | | | | 187/251 |
| 2011/0000746 | A1* | 1/2011 | Pelto-Huikko | B66B 7/062 |
| | | | | 187/254 |
| 2011/0259677 | A1* | 10/2011 | Dudde | B66B 7/062 |
| | | | | 187/411 |
| 2012/0329591 | A1* | 12/2012 | Goeser | B66B 7/062 |
| | | | | 474/238 |
| 2014/0087207 | A1* | 3/2014 | Zhao | B32B 27/08 |
| | | | | 428/623 |
| 2015/0191331 | A1* | 7/2015 | Orelup | D07B 1/22 |
| | | | | 428/76 |
| 2015/0259176 | A1* | 9/2015 | Goeser | B66B 7/062 |
| | | | | 428/189 |
| 2015/0307321 | A1* | 10/2015 | Breite | D07B 1/02 |
| | | | | 187/254 |
| 2015/0336335 | A1* | 11/2015 | Okawa | B29C 43/12 |
| | | | | 187/401 |
| 2015/0348668 | A1* | 12/2015 | Niu | H01B 1/04 |
| | | | | 174/72 R |
| 2016/0145863 | A1* | 5/2016 | Bergman | E04B 9/225 |
| | | | | 52/506.05 |
| 2016/0325966 | A1* | 11/2016 | Papas | B66B 7/062 |
| 2017/0002199 | A1* | 1/2017 | Henze | C08K 5/5333 |
| 2017/0043979 | A1* | 2/2017 | Kucharczyk | B66B 7/062 |
| 2017/0057787 | A1* | 3/2017 | Zhao | B66B 7/062 |
| 2017/0101293 | A1* | 4/2017 | Eastman | B66B 7/062 |
| 2017/0284503 | A1* | 10/2017 | Goser | B66B 7/062 |
| 2018/0127239 | A1* | 5/2018 | Zafiris | B05D 1/265 |
| 2018/0155870 | A1* | 6/2018 | Eastman | D07B 1/162 |
| 2018/0162695 | A1* | 6/2018 | Eastman | B32B 5/022 |
| 2018/0215946 | A1* | 8/2018 | Zhao | B05D 3/12 |
| 2018/0251342 | A1* | 9/2018 | Eastman | B66B 7/062 |
| 2018/0282125 | A1* | 10/2018 | Zhao | D07B 1/16 |
| 2018/0305177 | A1* | 10/2018 | Zhao | F16G 5/14 |
| 2018/0305178 | A1* | 10/2018 | Martin | B66B 7/062 |
| 2018/0305181 | A1* | 10/2018 | Zhao | B66B 7/062 |
| 2018/0305182 | A1* | 10/2018 | Zhao | F16G 5/10 |
| 2018/0305866 | A1* | 10/2018 | Zhao | D07B 1/162 |
| 2018/0339473 | A1* | 11/2018 | Zhao | B64D 15/12 |
| 2018/0339882 | A1* | 11/2018 | Zhao | B66B 7/064 |
| 2019/0047821 | A1* | 2/2019 | Zhao | B66B 7/062 |
| 2019/0062114 | A1* | 2/2019 | Zhao | B66B 7/062 |
| 2019/0062115 | A1* | 2/2019 | Zhao | B66B 7/062 |
| 2019/0062116 | A1* | 2/2019 | Zhao | B66B 7/062 |
| 2019/0062117 | A1* | 2/2019 | Zhao | B66B 7/062 |
| 2019/0071281 | A1* | 3/2019 | Zhao | B66B 7/062 |
| 2019/0084803 | A1* | 3/2019 | Eastman | B66B 7/062 |
| 2019/0144243 | A1* | 5/2019 | Zhao | B66B 7/06 |
| | | | | 187/411 |
| 2019/0161321 | A1* | 5/2019 | Zhao | B66B 7/062 |
| 2019/0161322 | A1* | 5/2019 | Zhao | C08G 18/833 |
| 2019/0168999 | A1* | 6/2019 | Guilani | B66B 7/062 |
| 2019/0218061 | A1* | 7/2019 | Eastman | B66B 7/062 |
| 2019/0218063 | A1* | 7/2019 | Gurvich | B66B 7/1238 |

FOREIGN PATENT DOCUMENTS

| | | |
|---|---|---|
| CN | 102216646 A | 10/2011 |
| CN | 106029545 A | 10/2016 |
| CN | 106061880 A | 10/2016 |
| DE | 3921887 A1 | 1/1991 |
| EP | 0617079 B2 | 12/2004 |
| EP | 1153167 B1 | 5/2006 |
| EP | 1927608 B1 | 9/2009 |
| WO | 2009109434 A1 | 9/2009 |
| WO | 2013055328 A1 | 4/2013 |
| WO | 2016030298 A1 | 3/2016 |

OTHER PUBLICATIONS

Savatech; Trelleborg Slovenija; "Self-Extinguishing (fire and flame resistant) conveyor belts", Accessed Online: Aug. 16, 2017; 2 Pages. URL: http://www.savatech.eu/conveyor-belts/self-extinguishing-fire-and-flame-resistant-conveyor-belts.html.
Chinese Office Action Issued in CN Application No. 201810974684.3, dated Dec. 30, 2019, 26 Pages.
Ben Shi Yi Ming, "Practical plastic processing technology", 2000.
Statas. D, "Plastic modification and decoration", 1992.
"Practical Plastic Processing Technology", 2000.
Chinese Office Action for Chinese Applicaiton No. 201810974684.3; dated Jun. 3, 2021; 10 pages.
Plastic Modification and Decoration, Satas. D., Sinopec Press, Adhesion of Coatings, pp. 12-13, 1992.

* cited by examiner

BELT WITH SELF-EXTINGUISHING LAYER AND METHOD OF MAKING

BACKGROUND

Embodiments disclosed herein relate to elevator systems, and more particularly to load bearing members to suspend and/or drive elevator cars of an elevator system.

Elevator systems are useful for carrying passengers, cargo, or both, between various levels in a building. Some elevators are traction based and utilize load bearing members such as belt, ropes or cables for supporting the elevator car and achieving the desired movement and positioning of the elevator car.

Where a belt is used as a load bearing member, a plurality of tension members are embedded in a common jacket. The jacket retains the tension members in desired positions and provides a frictional load path. In an exemplary traction elevator system, a machine drives a traction sheave with which the belts interact to drive the elevator car along a hoistway. Belts typically utilize tension members formed from steel elements, but alternatively may utilize tension members formed from synthetic fibers or other materials, such as carbon fiber composites.

BRIEF DESCRIPTION

In one embodiment, a belt for an elevator system includes a plurality of tension members arranged along a belt width and extending longitudinally along a length of the belt and a jacket at least partially enclosing the plurality of tension members. The jacket defining a traction side of the belt configured to interface with a traction sheave of an elevator system. The jacket includes a base material layer, and a coating layer positioned over the base material layer formed from a self-extinguishing fluoroelastomer material.

Additionally or alternatively, in this or other embodiments a ratio of coating layer thickness to base material layer thickness is in the range of 1:5 to 1:40.

Additionally or alternatively, in this or other embodiments the base material layer is formed from a material selected from the group of polyurethanes, polyesters, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof.

Additionally or alternatively, in this or other embodiments an adhesive layer is located between the base material layer and the coating layer.

Additionally or alternatively, in this or other embodiments the fluoroelastomer material is one of an ethylene chlorotrifluoroethylene or a polyvinylidene fluoride material.

Additionally or alternatively, in this or other embodiments a tension member of the plurality of tension members is formed from a plurality of fibers suspended in a matrix material.

In another embodiment, an elevator system includes a hoistway, an elevator car located in the hoistway and movable therein, and a belt operably connected to the elevator car to suspend and/or drive the elevator car along the hoistway. The belt includes a plurality of tension members arranged along a belt width and extending longitudinally along a length of the belt, and a jacket at least partially enclosing the plurality of tension members. The jacket defines a traction side of the belt configured to interface with a traction sheave of an elevator system. The jacket includes a base material layer and a coating layer positioned over the base material layer formed from a self-extinguishing fluoroelastomer material.

Additionally or alternatively, in this or other embodiments a ratio of coating layer thickness to base material layer thickness is in the range of 1:5 to 1:40.

Additionally or alternatively, in this or other embodiments the base material layer is formed from a material selected from the group of polyurethanes, polyesters, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof.

Additionally or alternatively, in this or other embodiments an adhesive layer is located between the base material layer and the coating layer.

Additionally or alternatively, in this or other embodiments the fluoroelastomer material is one of an ethylene chlorotrifluoroethylene or a polyvinylidene fluoride material.

Additionally or alternatively, in this or other embodiments a tension member of the plurality of tension members is formed from a plurality of fibers suspended in a matrix material.

In yet another embodiment, a method of forming a belt for an elevator system includes forming a plurality of tension members and encapsulating the plurality of tension members in a jacket. The jacket includes a base material layer and a coating layer formed from the self-extinguishing fluoroelastomer material.

Additionally or alternatively, in this or other embodiments the base material layer is applied to the plurality of tension members via an extrusion process and the coating layer is applied to the base material layer after completion of the extrusion process.

Additionally or alternatively, in this or other embodiments an adhesive layer is applied to the base material layer before applying the coating layer.

Additionally or alternatively, in this or other embodiments the base material layer and the coating layer are formed over the plurality of tension members via a co-extrusion process.

Additionally or alternatively, in this or other embodiments a ratio of a coating layer thickness to a base material layer thickness is in the range of 1:5 to 1:40.

Additionally or alternatively, in this or other embodiments the fluoroelastomer material is one of an ethylene chlorotrifluoroethylene or a polyvinylidene fluoride material.

Additionally or alternatively, in this or other embodiments a tension member of the plurality of tension members is formed from a plurality of fibers suspended in a matrix material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
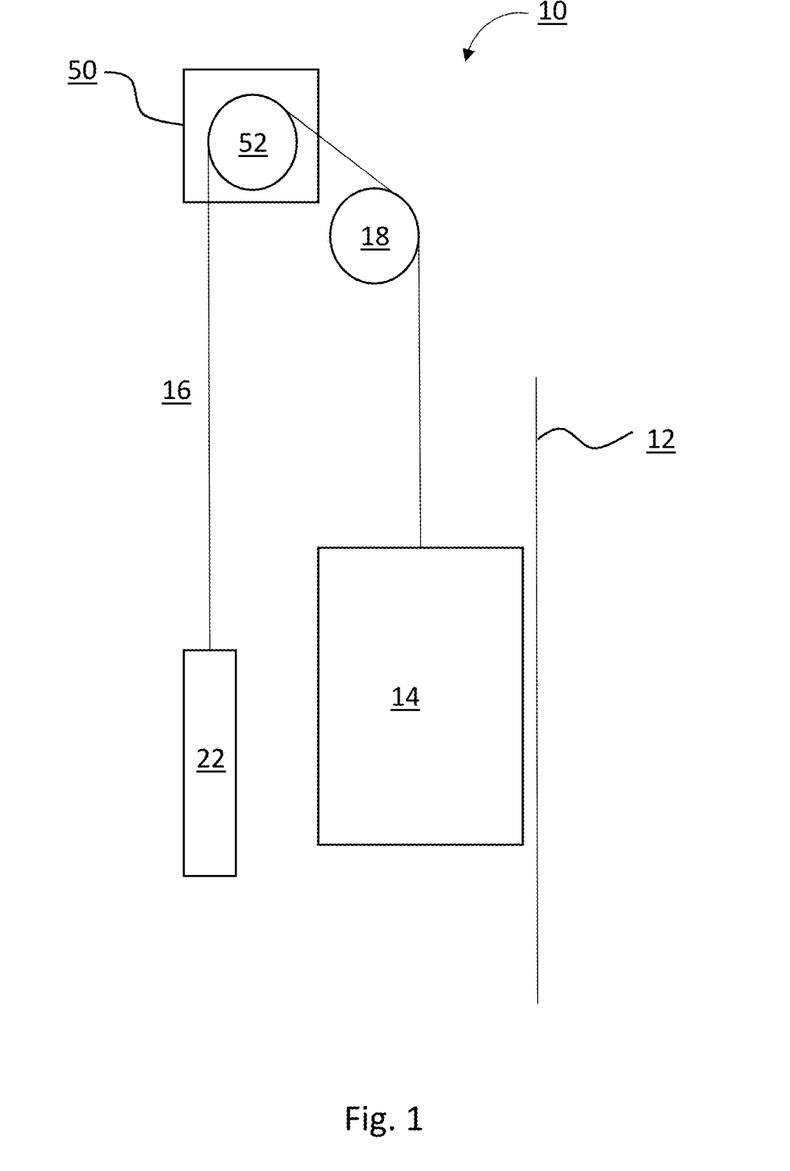
FIG. 1 is a schematic illustration of an embodiment of an elevator system.

Shown in FIG. 1, is a schematic view of an exemplary traction elevator system 10. Features of the elevator system 10 that are not required for an understanding of the present invention (such as the guide rails, safeties, etc.) are not discussed herein. The elevator system 10 includes an elevator car 14 operatively suspended or supported in a hoistway 12 with one or more load bearing members, such as belts 16. It is to be appreciated that while the present description is in the context of belts 16 as load bearing members, the present disclosure may be applied to other load bearing members, such as cables or ropes.

The one or more belts 16 interact with sheaves 18 and 52 to be routed around various components of the elevator system 10. Sheave 18 is configured as a diverter, deflector or idler sheave and sheave 52 is configured as a traction sheave 52, driven by a machine 50. Movement of the traction sheave 52 by the machine 50 drives, moves and/or propels (through traction) the one or more belts 16 that are routed around the traction sheave 52. Diverter, deflector or idler sheaves 18 are not driven by a machine 50, but help guide the one or more belts 16 around the various components of the elevator system 10. The one or more belts 16 could also be connected to a counterweight 22, which is used to help balance the elevator system 10 and reduce the difference in belt tension on both sides of the traction sheave during operation. The sheaves 18 and 52 each have a diameter, which may be the same or different from each other.

In some embodiments, the elevator system 10 could use two or more belts 16 for suspending and/or driving the elevator car 14 In addition, the elevator system 10 could have various configurations such that either both sides of the one or more belts 16 engage the sheaves 18, 52 or only one side of the one or more belts 16 engages the sheaves 18, 52. The embodiment of FIG. 1 shows a 1:1 roping arrangement in which the one or more belts 16 terminate at the car 14 and counterweight 22, while other embodiments may utilize other roping arrangements.

The belts 16 are constructed to meet belt life requirements and have smooth operation, while being sufficiently strong to be capable of meeting strength requirements for suspending and/or driving the elevator car 14 and counterweight 22.

Figure 2:
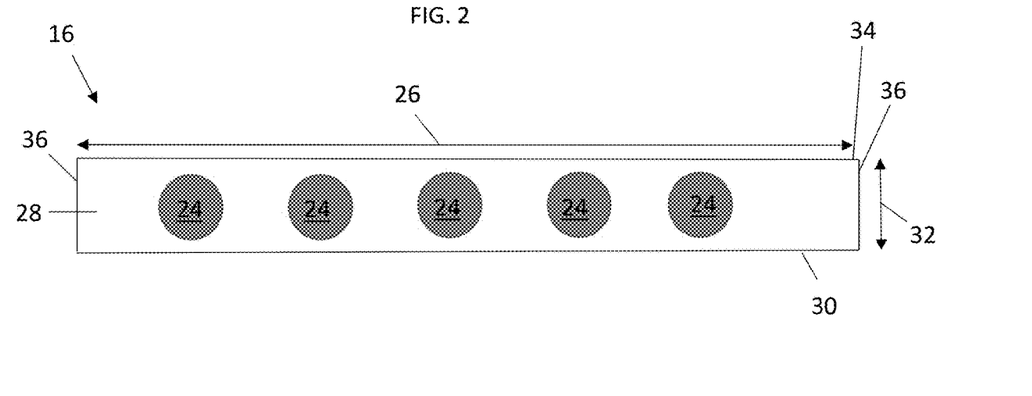
FIG. 2 is cross-sectional view of an embodiment of a belt for an elevator system.

FIG. 2 provides a cross-sectional schematic of an exemplary belt 16 construction or design. The belt 16 includes a plurality of tension members 24 extending longitudinally along the belt 16 and arranged across a belt width 26. The tension members 24 are at least partially enclosed in a jacket 28 to restrain movement of the tension members 24 in the belt 16 and to protect the tension members 24. The jacket 28 defines a traction side 30 configured to interact with a corresponding surface of the traction sheave 52. A primary function of the jacket 28 is to provide a sufficient coefficient of friction between the belt 16 and the traction sheave 52 to produce a desired amount of traction therebetween. The jacket 28 should also transmit the traction loads to the tension members 24. In addition, the jacket 28 should be wear resistant and protect the tension members 24 from impact damage, exposure to environmental factors, such as chemicals, for example.

The belt 16 has a belt width 26 and a belt thickness 32, with an aspect ratio of belt width 26 to belt thickness 32 greater than one. The belt 16 further includes a back side 34 opposite the traction side 30 and belt edges 36 extending between the traction side 30 and the back side 34. While five tension members 24 are illustrated in the embodiment of FIG. 2, other embodiments may include other numbers of tension members 24, for example, 6, 8, 10 or 12 tension members 24. Further, while the tension members 24 of the embodiment of FIG. 2 are substantially identical, in other embodiments, the tension members 24 may differ from one another.

Figure 3A:
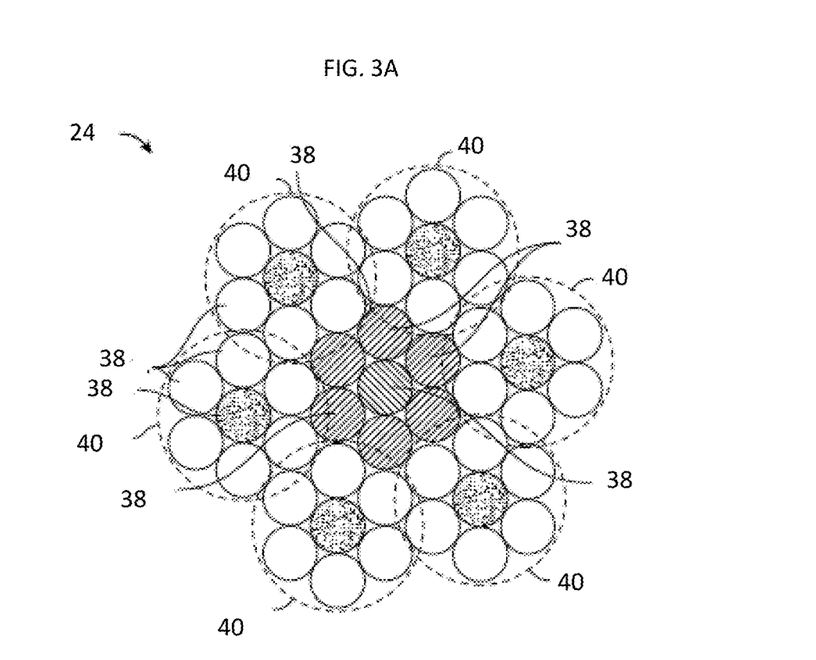
FIG. 3A is a cross-sectional view of an embodiment of a tension member for a belt for an elevator system.
Figure 3B:
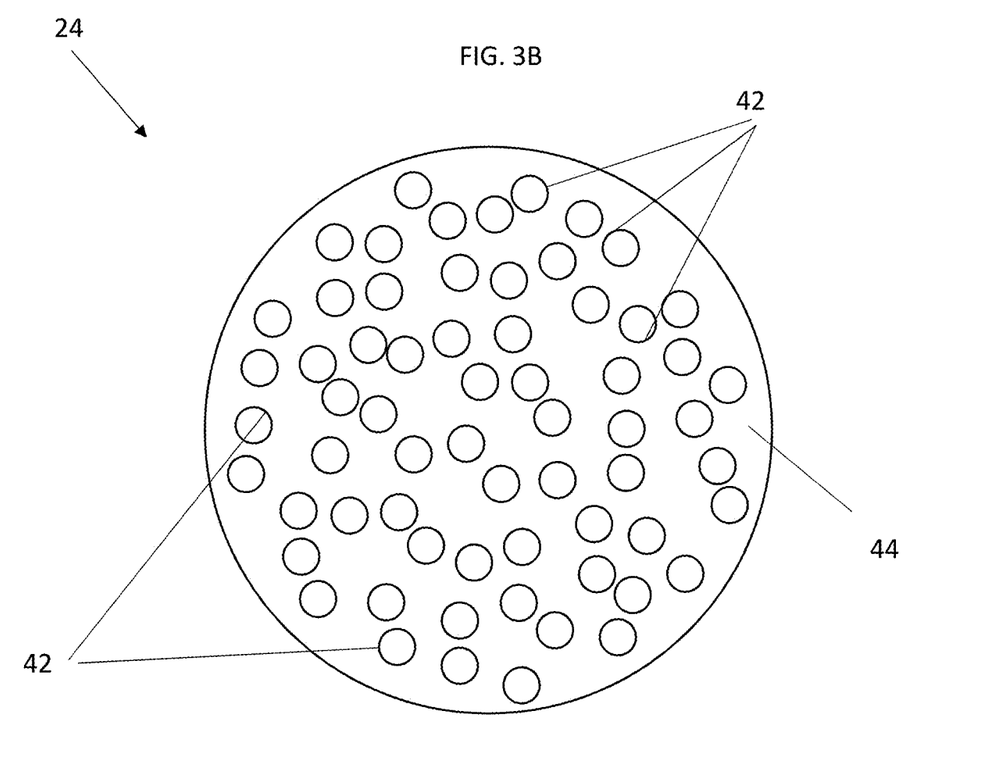
FIG. 3B is a cross-sectional view of another embodiment of a tension member for a belt for an elevator system.

Referring now to FIG. 3A, the tension member 24 may be a plurality of wires 38, for example, steel wires 38, which in some embodiments are formed into one or more strands 40. In other embodiments, such as shown in FIG. 3B, the tension member 24 may include a plurality of fibers 42, such as liquid crystal polymer, carbon fiber, glass fiber or aramid fiber, disposed in a matrix material 44. Materials such as polyurethane, vinylester, or epoxy may be utilized as the matrix material.

Figure 4:
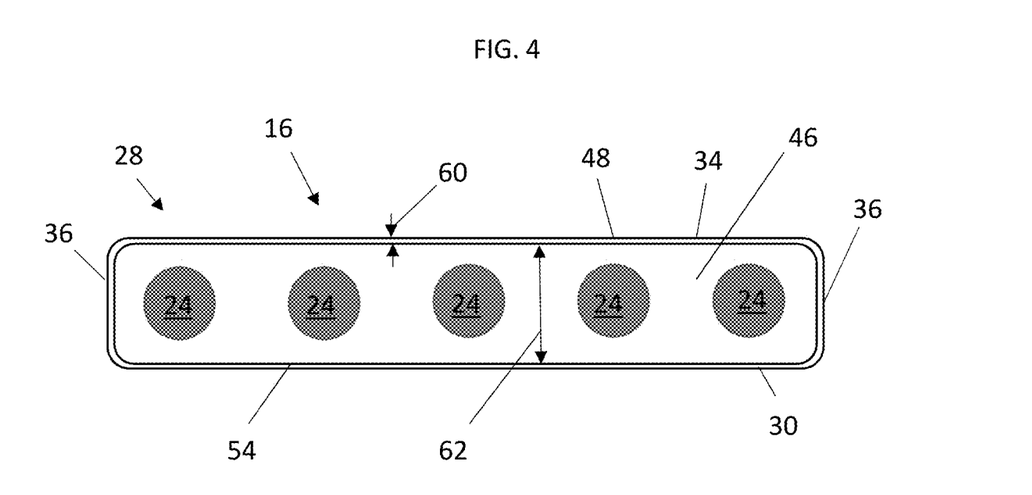
FIG. 4 is a cross-sectional view of an embodiment of a belt for an elevator system.

Referring now to FIG. 4, the jacket 28 includes a base material layer 46, with a coating layer 48 disposed over the base material layer 46 and defining one or more of the traction side 30, the back side 34 and/or belt edges 36. The coating layer 48 has a coating layer thickness 60, which is less than a base layer thickness 62 of the base material layer 46 of the jacket 28. In some embodiments, a ratio of coating layer thickness 60 to base layer thickness 62 is in the range of 1:5 to 1:40. An adhesive layer 54 may be disposed between the base material layer 46 and the coating layer 48 to promote adhesion therebetween.

The coating layer 48 is formed from a selective fluoroelastomer material. The selective fluoroelastomers are polyvinylidene fluoride (PVDF) and/or ethylene chlorotrifluoroethylene (ECTFE) based. Ethylene chlorotrfluoroethylene polymer, unlike most thermoplastics, when placed in flame, it does not form flaming droplets. On removal of the flame from the material, the material immediately extinguishes. The material will not ignite or propagate flame in atmosphere containing up to 52% oxygen, and has an auto-ignition temperature of at least 655 degrees Celsius. The fluoroelastomer material further had a Shore D hardness in the range of 39-75, and a stress at breakage of at least 32 Megapascals. Further, the fluoroelastomer material has an elongation at break of between 250% and 500% compared to its unloaded length.

In some embodiments, the base material layer 46 is formed from materials such as polyurethanes, polyesters, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof.

Figure 5:
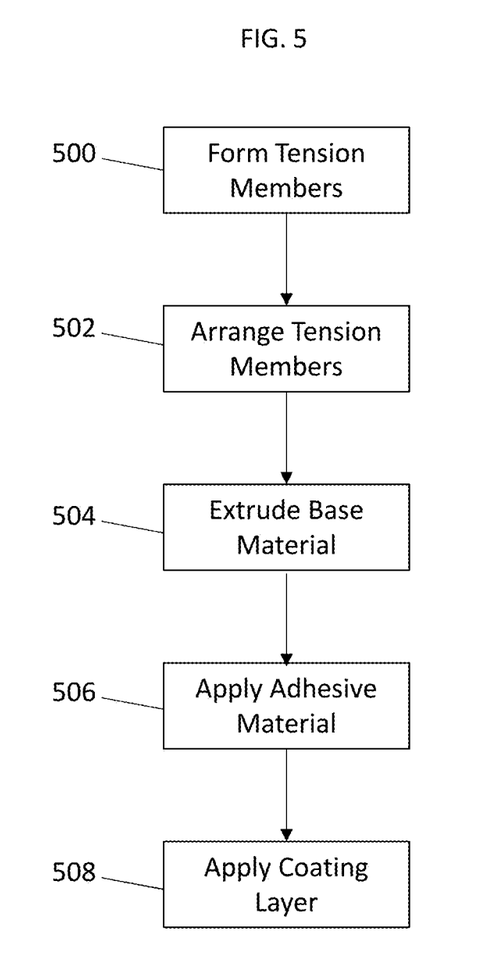
FIG. 5 schematically illustrates an exemplary method of forming a belt for an elevator system.

Referring now to FIG. 5, in some embodiments the belt 16 is produced by casting the coating layer 48 onto the base material layer 46 of an existing belt 16. In the method illustrated in FIG. 5, the tension members 24 are formed at block 500. The tension members 24 are then arranged at block 502 and passed through an extruder at block 504 at which the base material layer 46 is formed on the tension members 24. Once the base material layer 46 is formed, the adhesive layer 54 is applied to the base material layer 46 at block 506, and the coating layer 48 of ECTFE or PVDF is applied over the adhesive layer 54 at block 508.

Figure 6:
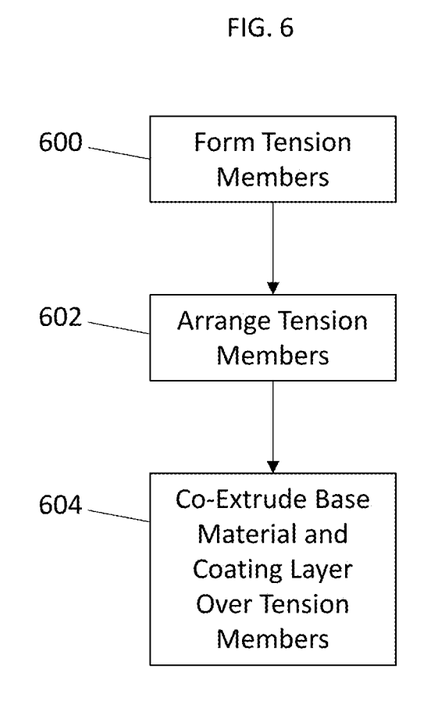
FIG. 6 schematically illustrates another exemplary method of forming a belt for an elevator system.

In another embodiment, as illustrated in FIG. 6, the belt 16 is produced by coextruding the coating layer 48 with the base material layer 46 over the tension members 24. For example, in the embodiment of FIG. 6, the tension members 24 are formed at block 600 and arranged at block 602. The tension members 24 are passed into an extruder at block 604 at which the base material layer 46, the coating layer 48, and in some embodiments, the adhesive layer 54 are applied to form the belt 16.

While the belt 16 may be formed via the methods of FIGS. 5 and 6, one skilled in the art will appreciate that the belt 16 may be formed from other methods such as hot lamination, coating, mold wheel or calendar processes.

Use of the selective fluoroelastomer material in the jacket 28 of the belt 16 improves fire performance of the jacket 28 and therefore the belt 16 and the elevator system 10, while still maintaining the desired mechanical and performance properties of the base material layer of the belt 16.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A belt for an elevator system, comprising:
   a plurality of tension members arranged along a belt width and extending longitudinally along a length of the belt;
   a jacket at least partially enclosing the plurality of tension members, the jacket defining a traction side of the belt configured to interface with a traction sheave of the elevator system, the jacket including:
   a base material layer;
   a coating layer disposed over the base material layer formed from a self-extinguishing fluoroelastomer material, the coating layer configured to improve fire performance of the belt; and
   an adhesive layer applied to the base material layer, the adhesive layer promoting adhesion between the base layer and the coating layer;
   wherein the coating layer is disposed at the traction side, a back side opposite the traction side, and both belt ends extending between the traction side and the back side;
   wherein the fluoroelastomer material has a Shore D hardness in a range of 39 to 75 and a stress at breakage of at least 32 Megapascals; and
   wherein the fluoroelastomer material has an elongation at break of between 250% and 500% compared to its unloaded length;
   wherein the fluoroelastomer material is an ethylene chlorotrifluoroethylene material.

2. The belt of claim 1, wherein a ratio of coating layer thickness to base material layer thickness is in the range of 1:5 to 1:40.

3. The belt of claim 1, wherein the base material layer is formed from a material selected from the group of polyurethanes, polyesters, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof.

4. The belt of claim 1, wherein a tension member of the plurality of tension members is formed from a plurality of fibers suspended in a matrix material.

5. An elevator system, comprising:
   a hoistway;
   an elevator car disposed in the hoistway and movable therein;
   a belt operably connected to the elevator car to suspend and/or drive the elevator car along the hoistway, the belt including:
   a plurality of tension members arranged along a belt width and extending longitudinally along a length of the belt;
   a jacket at least partially enclosing the plurality of tension members, the jacket defining a traction side of the belt configured to interface with a traction sheave of the elevator system, the jacket including:
   a base material layer;
   a coating layer disposed over the base material layer formed from a self-extinguishing fluoroelastomer material, the coating layer configured to improve fire performance of the belt; and
   an adhesive layer applied to the base material layer, the adhesive layer promoting adhesion between the base layer and the coating layer;
   wherein the coating layer is disposed at the traction side, a back side opposite the traction side, and both belt ends extending between the traction side and the back side;
   wherein the fluoroelastomer material has a Shore D hardness in a range of 39 to 75 and a stress at breakage of at least 32 Megapascals; and
   wherein the fluoroelastomer material has an elongation at break of between 250% and 500% compared to its unloaded length;
   wherein the fluoroelastomer material is an ethylene chlorotrifluoroethylene material.

6. The elevator system of claim 5, wherein a ratio of coating layer thickness to base material layer thickness is in the range of 1:5 to 1:40.

7. The elevator system of claim 5, wherein the base material layer is formed from a material selected from the group of polyurethanes, polyesters, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof.

8. The elevator system of claim 5, wherein a tension member of the plurality of tension members is formed from a plurality of fibers suspended in a matrix material.

* * * * *